(12) United States Patent
Christian et al.

(10) Patent No.: US 8,063,968 B2
(45) Date of Patent: Nov. 22, 2011

(54) DEVICE FOR DETECTING AN IMAGE OF A NONPLANAR SURFACE

(75) Inventors: Hugh Christian, Huntsville, AL (US); Earl K. Aamodt, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 398 days.

(21) Appl. No.: 12/178,576

(22) Filed: Jul. 23, 2008

(65) Prior Publication Data

US 2010/0020216 A1      Jan. 28, 2010

(51) Int. Cl.
*H04N 3/14*     (2006.01)
*H04N 5/335*    (2011.01)

(52) U.S. Cl. .......... 348/315; 348/294; 348/316

(58) Field of Classification Search .......... 348/315
See application file for complete search history.

(56) References Cited

U.S. PATENT DOCUMENTS

| | | | |
|---|---|---|---|
| 5,489,940 A * | 2/1996 | Richardson et al. .......... 348/315 |
| 5,604,534 A | 2/1997 | Hedges et al. | |
| 5,703,687 A | 12/1997 | Kumagai et al. | |
| 6,057,539 A * | 5/2000 | Zhou et al. .......... 250/208.1 |
| 6,111,568 A * | 8/2000 | Reber et al. .......... 715/720 |
| 6,826,358 B2 | 11/2004 | Partynski et al. | |
| 7,009,645 B1 * | 3/2006 | Sandini et al. .......... 348/275 |
| 7,224,392 B2 * | 5/2007 | Cahill et al. .......... 348/315 |
| 2001/0054989 A1 | 12/2001 | Zavracky et al. | |
| 2002/0159647 A1 | 10/2002 | Blosser | |
| 2004/0017492 A1 * | 1/2004 | Stavely .......... 348/240.2 |
| 2006/0169870 A1 | 8/2006 | Silsby et al. | |
| 2006/0245640 A1 | 11/2006 | Szczuka | |
| 2009/0278977 A1 * | 11/2009 | Li .......... 348/345 |

* cited by examiner

*Primary Examiner* — Tuan Ho
*Assistant Examiner* — Jason Flohre
(74) *Attorney, Agent, or Firm* — McDermott Will & Emery LLP

(57) ABSTRACT

An image sensing device for detecting an image of a nonplanar surface includes a plurality of pixels configured to detect the image of the nonplanar surface. The plurality of pixels are associated with a plurality of pixel pitches. The plurality of pixels are positioned to maintain a constant image resolution of the nonplanar surface for the plurality of pixels, based on the plurality of pixel pitches associated with the plurality of pixels.

14 Claims, 5 Drawing Sheets

| 20 x 24 | 22 x 24 | 24 x 24 | 26 x 24 | 28 x 24 | 30 x 24 | 28 x 24 | 26 x 24 | 24 x 24 | 22 x 24 | 20 x 24 |
|---|---|---|---|---|---|---|---|---|---|---|
| 20 x 26 | 22 x 26 | 24 x 26 | 26 x 26 | 28 x 26 | 30 x 26 | 28 x 26 | 26 x 26 | 24 x 26 | 22 x 26 | 20 x 26 |
| 20 x 28 | 22 x 28 | 24 x 28 | 26 x 28 | 28 x 28 | 30 x 28 | 28 x 28 | 26 x 28 | 24 x 28 | 22 x 28 | 20 x 28 |
| 20 x 30 | 22 x 30 | 24 x 30 | 26 x 30 | 28 x 30 | 30 x 30 | 28 x 30 | 26 x 30 | 24 x 30 | 22 x 30 | 20 x 30 |
| 20 x 28 | 22 x 28 | 24 x 28 | 26 x 28 | 28 x 28 | 30 x 28 | 28 x 28 | 26 x 28 | 24 x 28 | 22 x 28 | 20 x 28 |
| 20 x 26 | 22 x 26 | 24 x 26 | 26 x 26 | 28 x 26 | 30 x 26 | 28 x 26 | 26 x 26 | 24 x 26 | 22 x 26 | 20 x 26 |
| 20 x 24 | 22 x 24 | 24 x 24 | 26 x 24 | 28 x 24 | 30 x 24 | 28 x 24 | 26 x 24 | 24 x 24 | 22 x 24 | 20 x 24 |

FIG. 4

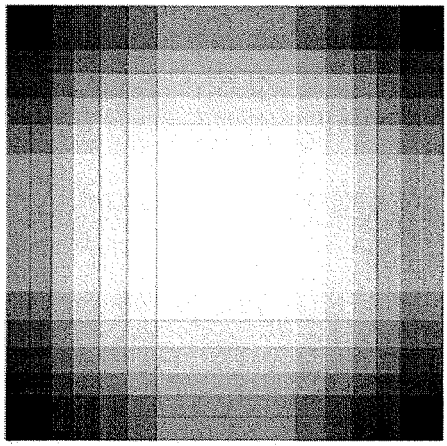
FIG. 5A Full Disk 15° x15°
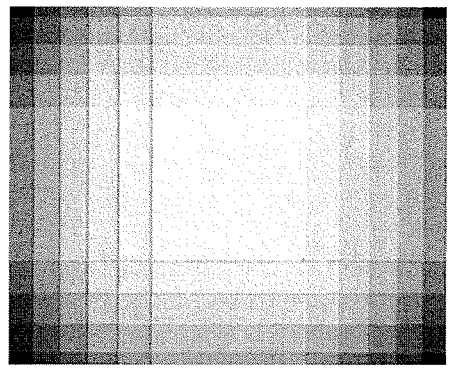
FIG. 5B Full Disk 12° x15°
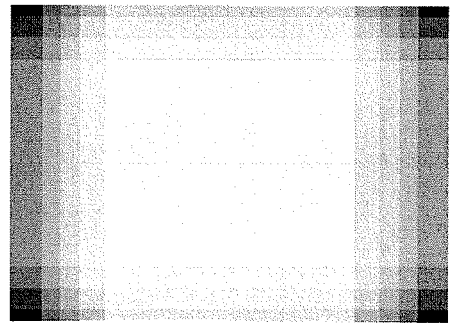
FIG. 5C Hemisphere 11° x15°
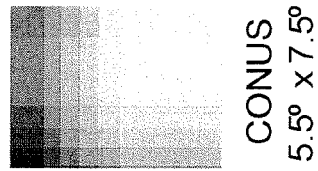
FIG. 5D CONUS 5.5° x 7.5°

DEVICE FOR DETECTING AN IMAGE OF A NONPLANAR SURFACE

STATEMENT AS TO RIGHTS TO INVENTIONS MADE UNDER FEDERALLY SPONSORED RESEARCH OR DEVELOPMENT

Not applicable.

FIELD

The subject technology relates generally to image sensors, and more specifically to a device for detecting an image of a nonplanar surface.

BACKGROUND

Image sensing devices such as focal point arrays (FPAs) can be used to detect various types of images. The complexity of image sensing devices may increase for nonplanar surfaces, particularly if it desired to maintain a constant image resolution in light of the variations in image geometry. Accordingly, it is desired to provide an efficient manner for maintaining constant image resolution when sensing nonplanar surfaces.

SUMMARY

In accordance with the disclosure, an image sensing device includes plural pixels associated with different pixel pitches. The pixels are positioned based on the different pixel pitches, to maintain a constant image resolution.

In one aspect of the disclosure, an image sensing device for detecting an image of a nonplanar surface is provided. The image sensing device includes a plurality of pixels configured to detect the image of the nonplanar surface. The plurality of pixels are associated with a plurality of pixel pitches. The plurality of pixels are positioned to maintain a constant image resolution of the nonplanar surface for the plurality of pixels, based on the plurality of pixel pitches associated with the plurality of pixels.

In a further aspect of the disclosure, a focal plane array for detecting an image of a nonplanar surface is provided. The focal plane array includes a plurality of pixels configured to detect the image of the nonplanar surface. The plurality of pixels are associated with a plurality of pixel pitches. The plurality of pixels are positioned to maintain a constant image resolution of the nonplanar surface for the plurality of pixels, based on the plurality of pixel pitches associated with the plurality of pixels. The focal plane array further comprises a memory configured to store the image detected by the plurality of pixels.

It is to be understood that both the foregoing summary of the invention and the following detailed description are exemplary and explanatory and are intended to provide further explanation of the invention as claimed.

BRIEF DESCRIPTION OF THE DRAWINGS

FIG. 4 is a conceptual diagram further illustrating the pixel layout corresponding with the image area of FIG. 3.

FIGS. 5A to 5D are conceptual diagrams illustrating examples of pixel configurations for different nonplanar surfaces.

DETAILED DESCRIPTION

Figure 1:
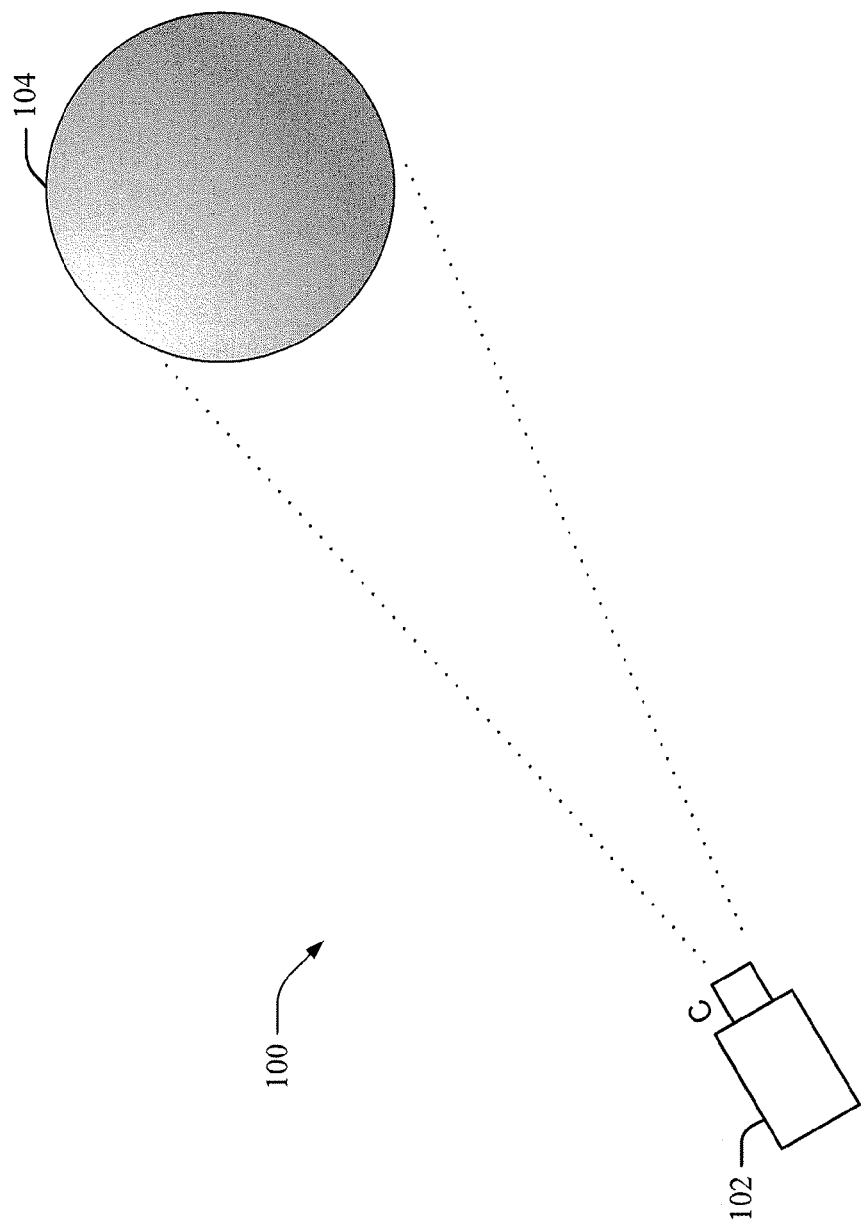
FIG. 1 is a conceptual diagram illustrating an exemplary image sensing device for detecting an image of a spherical object.

FIG. 1 is a conceptual diagram illustrating an exemplary image sensing device for detecting an image of a spherical object. As can be seen in FIG. 1, image sensing device is positioned to detect an image for an object 104 (e.g., a spherical object). Image sensing device may correspond with a focal plane array (FPA), a charge-coupled device (CCD) sensor, a complementary metal-oxide-semiconductor (CMOS) sensor, or another type of image sensing device.

Figure 2:
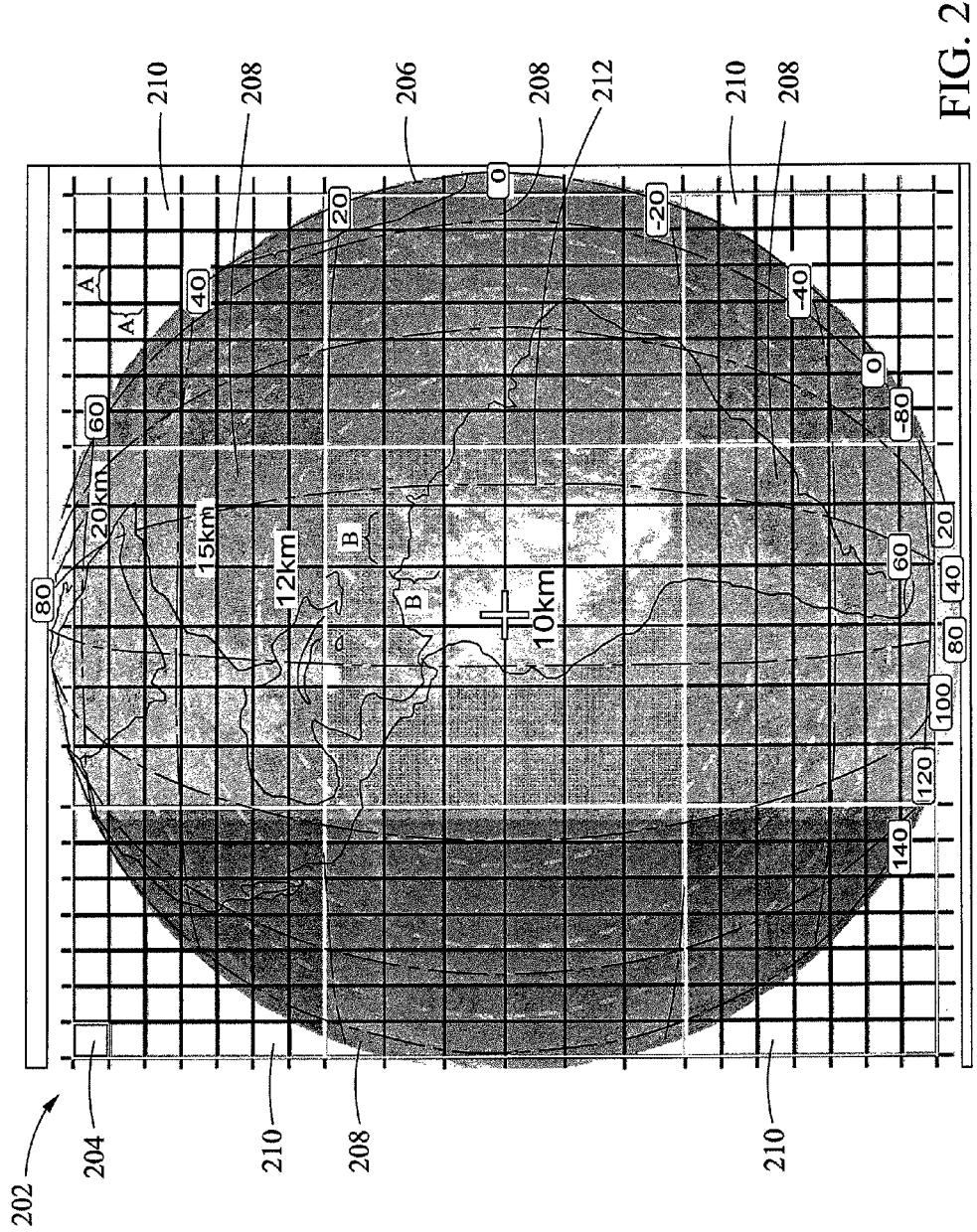
FIG. 2 is a conceptual diagram illustrating an exemplary arrangement of pixels in an image sensing device, for detecting an image of a spherical object.

FIG. 2 is a conceptual diagram illustrating an exemplary arrangement of pixels in an image sensing device, for detecting an image of a spherical object. As can be seen in FIG. 2, an array (e.g., FPA) 202 associated with an image sensing device (e.g., image sensing device 102) may include plural pixels to detect an image of the earth 206. Each pixel 204 may be associated with different pixel pitches, resulting in different sizes and geometries for pixels 204. Further, pixels 204 may be positioned within array 202 to maintain image resolution (e.g., ground sample distance resolution), based on the different pixel pitches. In this regard, ground sample distance (GSD) resolution can be seen to correspond with the size of the ground area on the surface of the earth 206 corresponding to one pixel in array 202.

When using a single (instead of varied) pixel pitch for viewing a nonplanar surface such as the earth 206, the GSD will likely vary. Such variance may be at least partially attributable to the spherical shape of the earth. In particular, when viewing curved surfaces, the amount of surface area typically increases when shifting the view away from the nadir. For example, a pixel with a given pixel pitch may detect 8 km×8 km at the nadir, while a pixel with that same pitch may detect 24 km×24 km at the edge of the field of view (FOV). In addition, the area detected may not always remain square.

Accordingly, by using different pixel pitches to create different geometries of pixels for array 202, constant (or near constant) image resolution may be maintained. In the example shown in FIG. 2, the group sample distance resolutions may be approximated as follows (with 53.2° N corresponding to 15.2° field of view (FOV)):

10 km: nadir
12 km: 27.5° N
15 km: 39.3° N
20 km: 51° N
25 km: 56° N
30 km: 60° N As can be seen in FIG. 2, different pixel pitches may be used in going from the nadir to the periphery of array 202, as array 202 views earth 206. The pixels with smaller pixel pitches may be positioned at the periphery array 202, to view the surface areas of the earth that are approximately the same size as those surface areas viewed at nadir, as the image sensing device looks from overhead. In one embodiment, the image sensing device may be mounted on a spacecraft (not shown).

In the example of FIG. 2, two pixel pitches (e.g., "A" and "B") may be used to create three regions (e.g., 208, 210 and 212) with different resolutions. It should be noted that a different number of pixel pitches and regions may be used. Region 212 may use pixel pitches of A×A, regions 208 may use pixel pitches of A×B (or B×A), and regions 210 may use pixel pitches of B×B. This is seen to create square pixels in the center and diagonal areas of array 202, and to create rectangular pixels in the regions north-south and east-west of the center region 212.

Accordingly, pixel pitches for an image sensing device (e.g., image sensing device 102) may be varied to match the size of varying image geometry, in order to maintain constant image resolution. This is seen to increase off-nadir resolution to compensate for pixel spreading due to foreshortening caused by curvature of the earth. This configuration and technique can be applied to CCDs (row and column) and to CMOS FPAs (individual pixels), among other image sensing devices.

Figure 3:
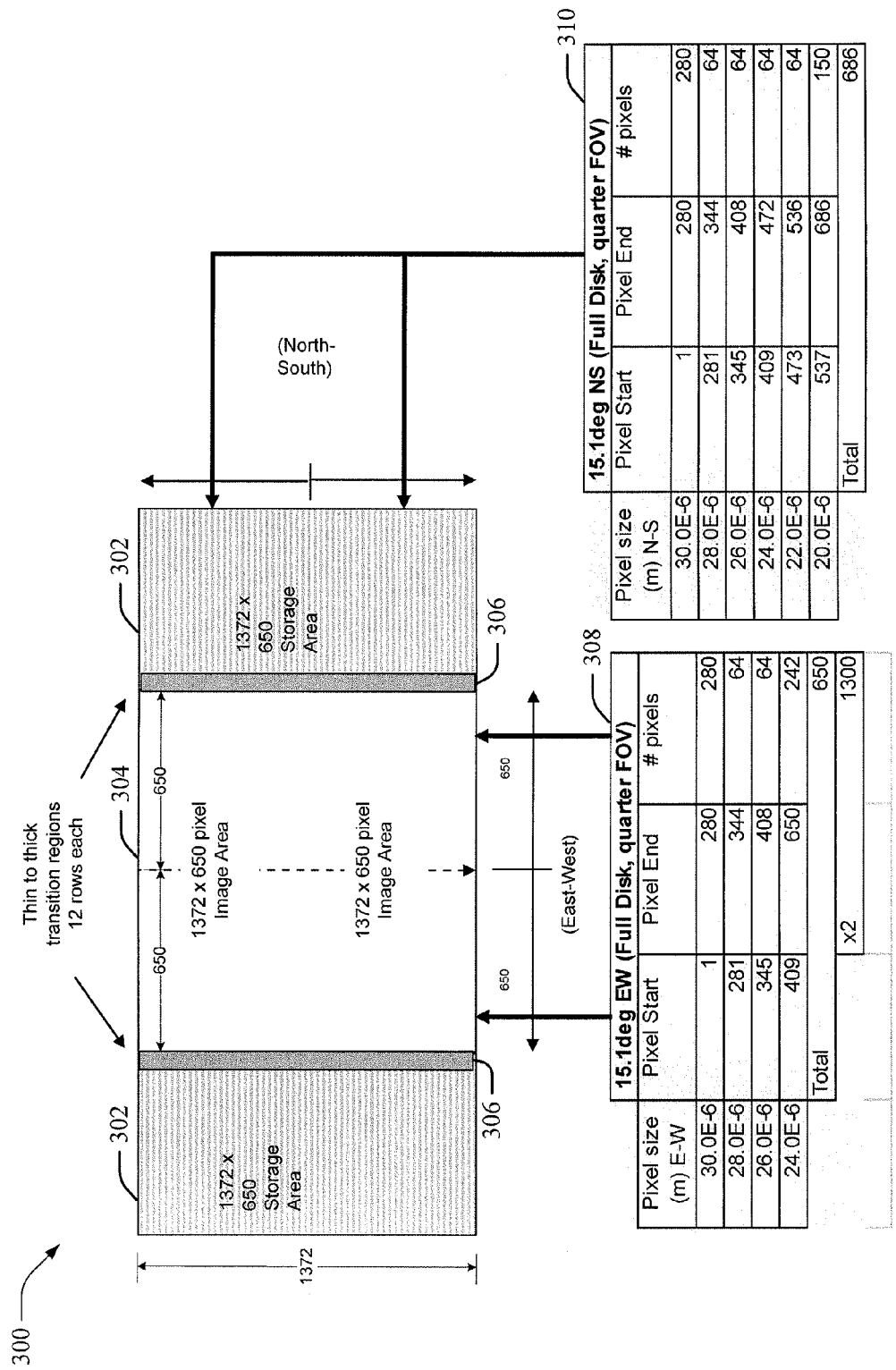
FIG. 3 is a conceptual diagram illustrating an exemplary configuration for a storage area and an image area of an image sensing device for detecting an image of a nonplanar surface.

FIG. 3 is a conceptual diagram illustrating an exemplary configuration for a storage area and an image area of an image sensing device for detecting an image of a nonplanar surface, and FIG. 4 is a conceptual diagram further illustrating the pixel layout corresponding with the image area of FIG. 3. As described above with reference to FIG. 2, two or more different pixel pitches may be used to create regions with different resolutions. The use of more than two pixel pitches may provide for finer granularity in compensation.

FIG. 3 depicts an exemplary configuration of an image area 304 for detecting an image of an object. The image area 304 may correspond with a geometry of different pixel pitches. FIG. 3 further depicts storage areas 302 for storing image data detected by image area 304. Transition regions 306 may also be used to provide a transition from the storage areas 302 to the array of pixels 304. Storage areas 302, image area 304 and transition regions 306 may, for example, be included within an image sensing device.

As can be seen in FIG. 3, image area 304 may be configured to use pixel pitches of 30.0E-6 m, 28.0E-6 m, 26.0E-6 m and 24.0E-6 m in the east-west direction. In addition, image area 304 may be configured to use pixel pitches of 30.0E-6 m, 28.0E-6 m, 26.0E-6 m, 24.0E-6 m, 22.0E-6 m and 20.0E-6 m in the north-south direction.

Further, pixel pitches in the east-west direction may start from 30.0E-6 m at the nadir (e.g., center) and decrease to 24.0E-6 as they approach the periphery, based on the pixel start and end positions in look-up chart 308. Pixel pitches in the north-south direction may start from 30.0E-6 m at the nadir and decrease to 20.0E-6 as they approach the periphery, based on the pixel start and end positions in look-up chart 310. In this regard, FIG. 4 (which is not necessarily drawn to scale) depicts the exemplary pixel layout based on look-up charts 308 and 310 of FIG. 3.

FIGS. 5A to 5D are conceptual diagrams illustrating examples of pixel configurations for different nonplanar surfaces. FIGS. 5A to 5D respectively illustrate exemplary configurations for sensing a full disk at 15°×15° field of view (FOV), another full disk at 12°×15° FOV, a hemisphere at 11°×15° FOV and the continental United States (CONUS) at 5.5°×7.5° FOV.

The pixel configuration for the nonplanar surfaces for FIGS. 5A to 5D may be similar to those discussed above with reference to FIGS. 2 to 4. As noted above, smaller pixel pitches may be used when moving from the nadir to the periphery for spherical objects. In addition, square pixels may be used in the center and along diagonals of the array, while rectangular pixels may be used in directions north-south and east-west of the center.

Accordingly, as discussed with reference in the above-described embodiments, compensation for ground sample distance is seen to be achieved by varying pixel pitch in an image sensing device. Such embodiments can be implemented, for example, using FPA, CCD or CMOS sensor technology.

In addition, such embodiments are seen to be low cost, easily implemented and may be applied to different geometrical distortion problems. Such embodiments are seen to provide a considerable cost savings in image sensor (e.g., FPA) design and fabrication, and are seen to make more effective and uniform use of processing.

Further, the above embodiments are seen to be applicable to various types of systems. For example, the above embodiments may be used for viewing the surface of the earth from geosynchronous orbit. In addition, the embodiments may be useful for sensing other types of nonplanar surfaces. Further, the embodiments may be useful in advanced sensors, low/counter low observables, and/or photonics and optical computing.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An image sensing device for detecting an image of a nonplanar surface, comprising:
    a plurality of pixels configured to detect the image of the nonplanar surface,
    wherein the plurality of pixels are associated with a plurality of pixel pitches,
    wherein the plurality of pixels are positioned in an array configuration and to maintain a constant image resolution of the nonplanar surface for the plurality of pixels, based on the plurality of pixel pitches associated with the plurality of pixels, and
    wherein a size of each of the plurality of pixels decreases from a nadir of the array to a periphery of the array.

2. The image sensing device of claim 1, wherein the image sensing device is a focal plane array (FPA).

3. The image sensing device of claim 1, wherein the nonplanar surface corresponds to a sphere.

4. The image sensing device of claim 1, wherein the image sensing device is configured to couple to a spacecraft.

5. The image sensing device of claim 1, wherein the plurality of pixel pitches range from 20 µm to 30 µm.

6. The image sensing device of claim 1, wherein the image sensing device is a charge-coupled device (CCD) image sensor.

7. The image sensing device of claim 1, wherein the image sensing device is a complementary metal-oxide-semiconductor (CMOS) sensor.

8. The image sensing device of claim 1, further comprising a memory configured to store the image detected by the plurality of pixels.

9. A focal plane array for detecting an image of a nonplanar surface, comprising:
   a plurality of pixels configured to detect the image of the nonplanar surface,
   wherein the plurality of pixels is associated with a plurality of pixel pitches,
   wherein the plurality of pixels are positioned in an array configuration and to maintain a constant image resolution of the nonplanar surface for the plurality of pixels, based on the plurality of pixel pitches associated with the plurality of pixels, and
   wherein a size of each of the plurality of pixels decreases from a nadir of the array to a periphery of the array; and
   a memory configured to store the image detected by the plurality of pixels.

10. The focal plane array of claim 9, wherein the nonplanar surface corresponds to a sphere.

11. The focal plane array of claim 9, wherein the image sensing device is configured to couple to a spacecraft.

12. The focal plane array of claim 9, wherein the plurality of pixel pitches range from 20 μm to 30 μm.

13. The focal plane array of claim 9, wherein the image sensing device is a charge-coupled device (CCD) image sensor.

14. The focal plane array of claim 9, wherein the image sensing device is a complementary metal-oxide-semiconductor (CMOS) sensor.

* * * * *